Oct. 9, 1928.   1,687,281
P. A. COONEY
APPARATUS FOR MEASURING PRODUCTION
Filed March 17, 1926    4 Sheets-Sheet 1
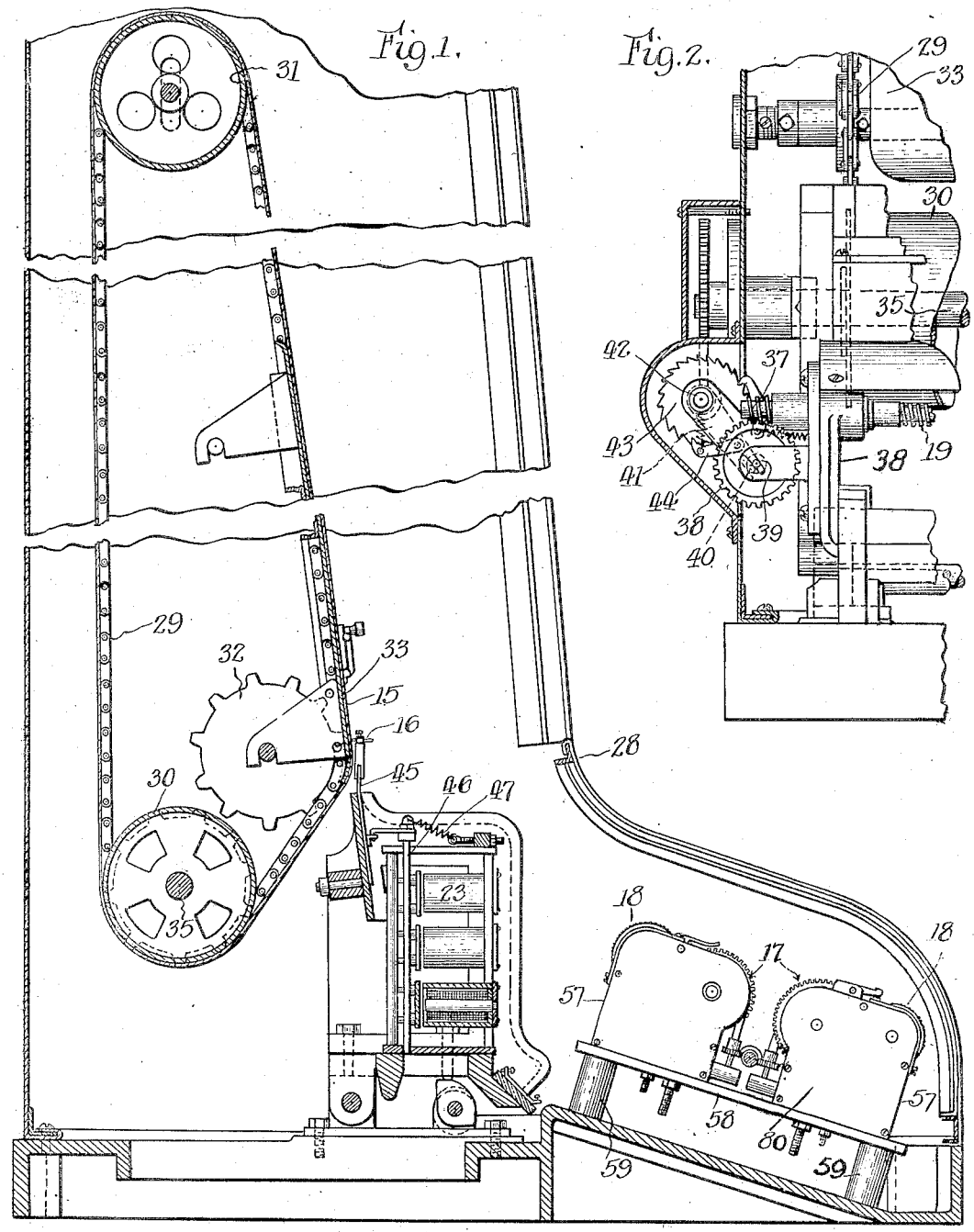

Oct. 9, 1928.

P. A. COONEY 1,687,281

APPARATUS FOR MEASURING PRODUCTION

Filed March 17, 1926  4 Sheets-Sheet 2

Inventor:
Peter A. Cooney,
By Chindal & Parker Carlson
Attys.

Oct. 9, 1928.
P. A. COONEY
1,687,281
APPARATUS FOR MEASURING PRODUCTION
Filed March 17, 1926    4 Sheets-Sheet 3
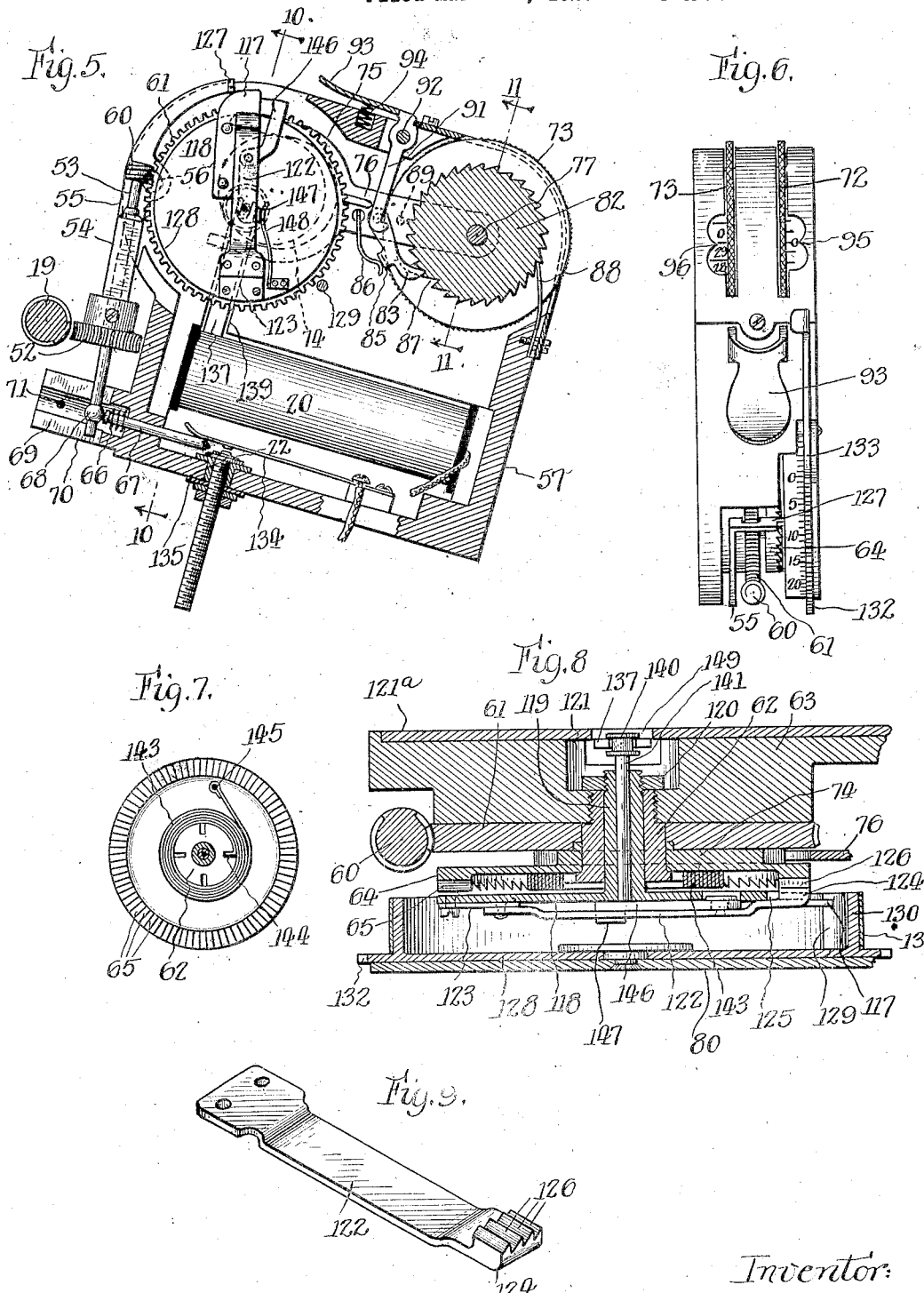

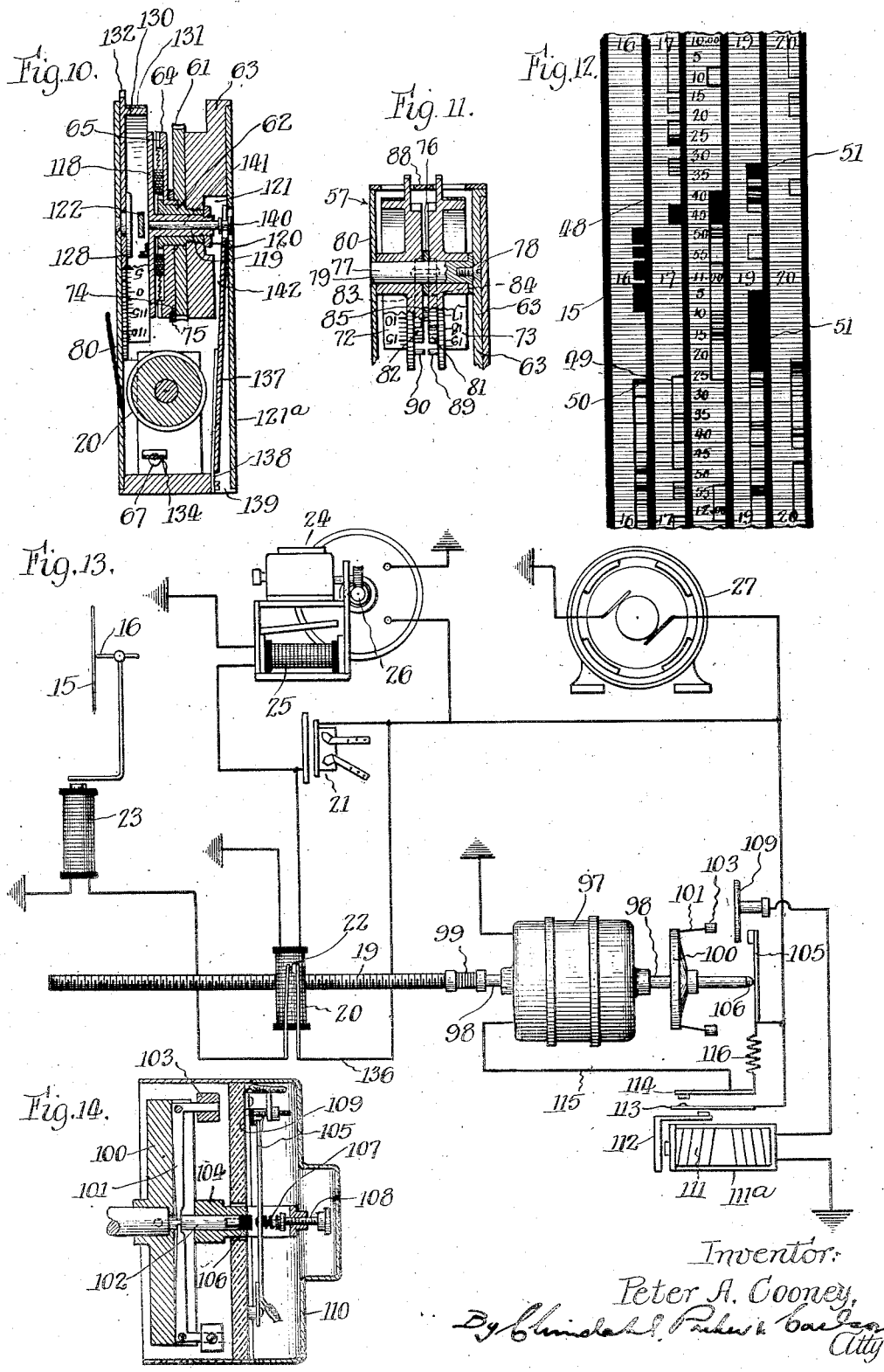

Patented Oct. 9, 1928.

1,687,281

UNITED STATES PATENT OFFICE.

PETER A. COONEY, OF CHICAGO, ILLINOIS, ASSIGNOR, BY MESNE ASSIGNMENTS, TO ELECTRECORDER CORPORATION, OF DOVER, DELAWARE, A CORPORATION OF DELAWARE.

APPARATUS FOR MEASURING PRODUCTION.

Application filed March 17, 1926. Serial No. 95,248.

The general aim of this invention is to provide an efficiency system for use in industrial plants to enable the management thereof to attain a higher degree of efficiency in operation than is possible with methods heretofore employed.

Inefficiency in an industrial plant involves, chiefly, waste of time on the part of the operator, waste of time due to the inefficient operation of machines, and the idleness of machines for reasons beyond the control of the operator. For example, the operator of a given machine may consume too much time in feeding work to the machine; the machine itself may be inefficient due to slipping belts, inefficient motors, etc.; and the management by failing properly to route work through the plant or to supply materials may enforce idleness of the machine when by proper routing, servicing the operators and otherwise planning ahead, the machine may be kept in approximately continuous operation. On the other hand, certain idle periods in the operation of a machine are necessary. Thus in operating a drill press or other machine which must be stopped at the completion of each operation, an idle period necessarily ensues in which the work previously operated upon is withdrawn and new work inserted. Such idle period may properly be longer than the actual producing period of the machine, but nevertheless, since it is unavoidable, it should be shown upon the records as actual producing time. In other words, in the study of efficiency in plant operation it is necessary to differentiate between the legitimate or unavoidable expenditure of time and avoidable or waste time. Moreover, it is necessary to take into account all of the excess or waste idle time even though it be only a fraction of a second in duration, for the reason that when such waste occurs with great frequency it may amount to several hours over the course of a day.

The primary object of my invention is to provide a system of measuring and registering the productive capacity of one or more machines, whereby it may be determined quickly and easily, first, at what time or times over a day's run a given machine is in operation; second, when the operation is efficient and when inefficient in view of a predetermined standard; third, what the total efficient operating time has been; and, fourth, what the total volume of production is, whether performed efficiently or inefficiently.

More specifically, the invention has for its object the provision of a speed register operating directly under the control of the machine in combination with a recording mechanism preferably in the form of a chart, a time register or totalizer and a volume register or counter; the recording mechanism and time totalizer being directly under the control of the speed register so as to differentiate between the legitimate or unavoidable idle time and waste or avoidable time in view of a predetermined standard, and the volume register or counter operating to record the total volume produced independently of the speed of production.

Another object is to provide a speed register and time totalizer unit of simple and compact construction and efficient in operation.

A general object is to provide a construction and arrangement which will ensure accuracy in the records produced including efficiency in the operation of the apparatus and freedom from tampering or manipulation by unscrupulous persons.

In the accompanying drawings, I have illustrated one embodiment only of the invention, but it is contemplated that various changes may be made in the form, construction and arrangement of the parts by those skilled in the art without departing from the spirit and scope of the invention as expressed in the appended claims.

For the sake of convenience, I have herein referred to the machine tool or other equipment whose productive capacity is to be measured as a "shop machine", and I have employed the term "register" or "registering" in the broad sense including permanent recording as well as non-permanent or changeable indications, such as may be contained on a disk, dial or similar indicator element.

Figure 1 of the drawings is a fragmentary vertical sectional view through an apparatus partially embodying my invention and which I have termed a "productometer".

Fig. 2 is a fragmentary front elevation illustrating the connection between the motor drive shaft and the recording chart of the productometer.

Fig. 5 is a view similar to Fig. 4 but showing the parts in a different operative position.

Fig. 6 is a plan view of the unit.

Fig. 7 is a detail view of a portion of the speed register.

Fig. 8 is a fragmentary sectional view on an enlarged scale through the speed register.

Fig. 9 is a perspective detail view of a part of the speed register.

Fig. 10 is a vertical sectional view of the speed register taken approximately in the plane of line 10—10 of Fig. 5.

Fig. 11 is a fragmentary sectional view through the totalizer taken approximately in the plane of line 11—11 of Fig. 5.

Fig. 12 is a view in plan of a section of a chart with a record of five shop machines thereon.

Fig. 13 is a diagrammatic view of the complete system and showing the electrical connections between the several parts.

Fig. 14 is a fragmentary sectional detail view showing the construction of a governor for maintaining constant the speed of the main drive shaft for the several registering devices composing the system.

Figure 3:
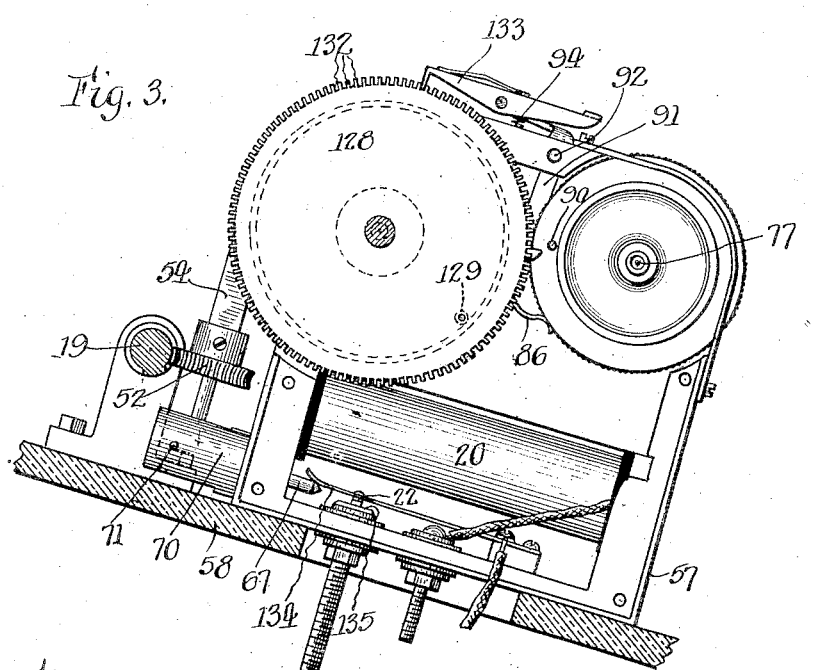
Fig. 3 is a side elevation of a speed register and time totalizer unit with the side cover plate removed and mounted upon a support, the latter being shown in section.

Referring first to Figs. 1 and 13, the machine comprises generally a recording or chart mechanism including a chart 15 and a stylus 16. The speed register is designated generally by the numeral 17, and 18 is the time totalizer, these two devices being combined in a single unit and driven from a shaft 19 under the control of a magnet 20 which latter is in turn controlled by a switch 21 operated by the shop machine in any suitable manner—for instance, as the switch 41 is illustrated and described as controlled by the productive operation of a saw in Letters Patent No. 1,285,049, of November 19, 1918. The time totalizer and the chart mechanism are under the control of the speed register, the former through a disengageable connection between the speed register and the shaft 19 as will be hereinafter described, and the latter through a switch 22 controlling the magnet 23 which operates the stylus 16. The switch 22 is also under the control of the speed register and arranged to break a normally closed circuit when the connection between the speed register and the shaft 19 is broken. 24 designates generally a volume register or counter including a magnet 25 operating under the control of the switch 21 to move the counter into and out of connection with a constantly driven shaft 26. 27 illustrates a generator providing a source of power.

It should be understood that while the following description is largely confined to a single group of registering devices composing the system, as many such groups may be provided as desired in accordance with the number of machines whose production is to be measured.

Proceeding now to a more detailed description of the apparatus: The several mechanisms with the exception of the volume register or counter are preferably enclosed within an upright casing 28 supported in any suitable or convenient manner, the chart mechanism being located rearwardly therein and the speed register and time totalizer units being located in a forward enlargement preferably beneath a glass top so as to be visible to an attendant stationed in front of the machine. The volume register or counter, which per se is covered in my copending application Serial No. 494,426, filed August 22, 1921 may be supported in a convenient way (not shown) at one side of the casing, this mechanism being independent of the other registering devices except that it is operated under the control of the switch 21 of the shop machine.

The chart 15 of the recording mechanism is in the form of an endless belt running over the usual end rolls actuated by a chain 29 running over a lower sprocket 30, an upper sheave 31, and an idler sprocket 32, the latter being positioned somewhat forwardly in the casing so as to guide the chart behind a shelf or table 33 over which the chart slides. The sprocket 30 is fixed upon a shaft 35 which constitutes the drive shaft for the chart mechanism and is operatively connected with the main drive shaft 19 as shown in Fig. 2.

Obviously, by reason of the high rate of speed at which said shaft 19 operates and the low speed at which the chart must operate, the connection therebetween must provide for a substantial reduction. Accordingly, said shaft 19, which is mounted in suitable brackets 36 (one only being shown), has one end projecting and provided with a drive worm 37 meshing with a worm wheel 38 suitably journalled in the bracket 36. Said wheel has rigid therewith a disk 39 provided with an eccentric pin 40 engaging the bifurcated end of an arm 41 loose on a shaft 42. Said shaft 42 carries a ratchet wheel 43 and the arm 41 carries a spring-pressed pawl 44 engaging the ratchet wheel so that in the oscillation of the arm 41 the ratchet wheel is driven. A suitable connection, preferably a worm gearing, is provided between the shaft 42 and the shaft 35 of the chart mechanism, and the parts are so proportioned and arranged that the chart is arranged to travel at a rate to indicate the time in hours and minutes.

The stylus 16 is herein shown as being mounted upon an arm 45 arranged to be swung laterally upon the energization of the magnet 23 through the medium of a rock shaft 46 and against the action of a coiled spring 47. Referring to Fig. 12, the stylus for each of the machines whose production is being recorded normally rests on the chart upon a heavy black line 48 in contact with the chart, and the arrangement is such (as will more fully hereinafter appear) that when a given machine is operating efficiently the marker magnet 23 is energized to draw the stylus 16 to the left of the chart so that in the operation of the latter a line 49 is drawn in spaced parallel relation with the heavy black line 48, and that when the machine is operating inefficiently the magnet 23 is periodically deenergized so as to cause the stylus to move to the right into its normal position upon the black line 48. In thus moving laterally, the stylus produces lateral or horizontal lines 50 on the chart which when occurring in fairly rapid succession produces in effect a black ribbon-like record as shown at 51.

The construction of the chart or recording mechanism forms per se no part of this invention; hence the general description thereof above set forth will, it is believed, suffice.

Referring now to Figs. 5 to 11, the speed register 17 and time totalizer 18 for each shop machine are constructed in the form of a unit arranged to be driven from the shaft 19. The latter has its periphery in the form of a worm which meshes with a worm wheel 52 fast on an upright spindle 53 mounted for movement toward and away from the shaft 19 so as to provide in effect a positive clutch connection between the shaft on the one hand and the associated speed and time register on the other. The spindle 53 is mounted in an elongated bearing block 54 which in turn is carried fast upon an arm 55 pivoted at 56 at one end of a casing 57 substantially rectangular in form and mounted upon a suitable support 58 (Fig. 1). The support 58 is in turn mounted in the main casing on posts 59, and is for convenience inclined upwardly and rearwardly so that the upper edge of the casing is located slightly beneath the glass top of the forwardly extended portion of the main casing, but in spaced parallel relation thereto.

The worm wheel 52 is fast upon the spindle 53 below the bearing 54, and the upper end of the spindle has a worm 60 meshing at all times with a worm wheel 61 rotatably mounted in the casing near one end thereof. As shown in Fig. 8, the wheel 61 is mounted to turn upon a central sleeve or bearing 62 which is screw threaded into the rear wall 63 of the casing. Rigid with the wheel 61 on the forward side thereof is a disk 64 provided on its forward face with ratchet teeth 65. When the worm wheel 52 on the spindle 53 is in mesh with the worm shaft 19 the worm wheel 61 and disk 64 rotate continually. Such connection is normally maintained by an expansion spring 66 encircling a sliding pin 67 mounted in the lower portion of the casing (Fig. 5) and bearing against a spherical surface 68 on the lower end of the spindle. The latter is arranged to slide in a slot 69 formed in an extension 70 of the casing, a transverse pin 71 being mounted in such extension across the slot to limit movement of the spindle by the spring.

The time register or totalizer comprises a pair of indicator wheels 72 and 73 one of which is scaled to register hours and the other minutes. These wheels are operatively associated with the disk 64 so as to be actuated thereby. To this end the disk 64 has formed on the side adjacent the worm wheel 61 an eccentrically disposed bearing or boss 74 with which the forked end 75 of an arm 76 engages. Said arm 76 is pivoted on a shaft 77 carrying the indicator wheels 72 and 73 and suitably secured at one end to the wall 63 of the casing as by means of a screw 78 (Fig. 11) and bearing in an aperture 79 in the opposed side wall 80 of the casing 57. Rigid with each of the disks 72 and 73, in juxtaposed relation, are a pair of ratchet wheels 81 and 82, and between these two ratchet wheels the arm 76 is interposed. A pair of pawls 83 and 84 are mounted on the arm 76 and depend therefrom so as to coact with the respective ratchet wheels 81 and 82. Said pawls are rigidly connected by a tie member 85 and are pressed by a leaf spring 86 toward their respective ratchet wheels. One of said pawls, namely, the pawl 84 for the minute wheel 72 has a nose or tip slightly longer than the other pawl so that the latter normally is held out of engagement with its ratchet wheel 81. The ratchet wheel 82, however, of the hour wheel is provided at a point coinciding with the zero position of the wheel, with a deep notch 87 (Fig. 5) and when the pawl 84 enters such notch it permits the pawl 83 to engage with a tooth of the hour ratchet wheel 81 to move it forward one step. The arrangement is such that for each complete rotation of the minute wheel 72 the hour wheel 73 is moved one step or a distance sufficient to register one hour.

A spring detent 88 mounted in the peripheral wall at one end of the casing and located between the two wheels 72 and 73 is arranged to engage with the ratchet wheels to prevent reverse rotation thereof. To enable the operator conveniently to position the indicator wheels at zero, they are respectively provided with pins 89 and 90, and a pair of hook members 91 are integrally secured together and pivoted in the peripheral wall at the top of the casing at 92, with an integral finger piece 93 between which and the casing is interposed a spring 94 normally holding the hook members out of the path of movement of the pins 89 and 90. The arrangement is such that a depression of the finger piece 93 will carry the hook members into the path of rotation of the pins 89 and 90, and the latter are so located that when thus engaging the hook members the indicator wheels 72 and 73 will be positioned with their zero points opposite pointers 95 and 96 overlying the wheels and secured to the peripheral wall of the casing (Figs. 5 and 6) at opposite ends of a cut away portion therein in which the wheels operate.

It will be seen from the foregoing that so long as the worm wheel 52 on the spindle 53 of a given unit engages with the worm of the shaft 19 the disk 64 will continue to rotate and hence the time indicator wheels 72 and 73 will be driven. Obviously the operative connections between the time indicator wheels are so proportioned with respect to the speed of the shaft 19 as to indicate accurately the expiration of time, the speed of the shaft being maintained constant under the control of a suitable governor means which will now be described.

Referring to Figs. 13 and 14, 97 designates an electric motor whose shaft 98 is directly connected by means of a suitable spring coupling 99 with the shaft 19. The motor receives its power from the generator 27 or other suitable source and operates at high speed under the control of a suitable governor device comprising a disk 100 fixed upon a motor shaft and carrying a pair of bell crank levers 101 pivoted near the periphery of the disk and having radially extending arms engaging a pin 102 alined with the motor shaft. The other arms of said levers carry weights 103 which under the action of centrifugal force operate to move the pin 102 axially through a bearing 104. As the pin thus slides axially it engages a movable switch member 105 through the medium of an insulated tip 106 and against the action of a coiled spring 107 which is adjustable by means of a screw 108. The switch member 105 normally engages a stationary contact 109 the whole being enclosed within a suitable housing 110. The contact 109 is connected with an electromagnet 111 and the latter has an armature 112 in the form of a bell crank having insulated contact with a movable switch member 113 adapted to engage a stationary contact 114 connected by means of a conductor 115 with the field of electric motor 97. The circuit through the contacts 105, 109 being closed, the magnet 111 is energized so that the circuit through the contacts 113, 114 is also closed with the result that energy is supplied directly to the motor 97. When, however, the speed of the motor exceeds a predetermined rate, the weights 103 acting through the pin 98 break the circuit. In this event a resistance element 116 is interposed in the connection between the contact 105 and the conductor 115 thus retarding the speed of the motor. Preferably, I employ a copper sleeve 111$^a$ around the magnet 111, which serves to retard the opening of the switch 113, 114 through the action of residual magnetism. Consequently the motor is permitted to attain a sufficiently high speed before it slows down to effect a clean break at the switch 105, 109 and thus prevent arcing at the contacts.

It will be observed that while the governor device produces strictly a constantly fluctuating speed of the motor, such fluctuations are uniform in character and therefore an average or mean speed which is substantially constant is maintained. Because the shaft 19 is driven at a high rate of speed and the various devices actuated thereby are driven at an exceedingly low rate of speed, the variations in the speed of the shaft when transmitted to the time totalizing devices render any inaccuracies practically negligible.

The controlling device for differentiating between legitimate or unavoidable idle time in the operation of a given shop machine, and waste or avoidable idle time, is herein for convenience termed the speed register. This device comprises mechanism which, under the control of the switch 21 at the shop machine, interrupts the operation of the time register or totalizer and of the chart mechanism or recorder when the productive capacity of the shop machine falls below a predetermined rate, but permits continued operation of such registering devices when the productive capacity equals or exceeds a predetermined rate.

Proceeding now to a detailed description of this mechanism, reference is made to Figs. 5 to 10. As hereinbefore set forth, the disk 64 which drives the time totalizer wheels 72 and 73 is provided on one face with ratchet teeth 65. These teeth form part of a clutch connection between the disk 64 and a cam member 117 forming part of a means for disengaging the worm wheel 52 from the shaft 19. Herein said cam member 117 is mounted upon a second disk 118 having a central bearing sleeve 119 (Fig. 8) entered through the bearing member 62 and held in position therein by means of a nut 120. To receive the nut 120 and the projected end of the sleeve 119 a recess 121 is formed in the rear wall of the casing, which latter is provided with an outer face plate 121$^a$ closing the recess. Mounted on the disk 118 near one edge thereof is the cam member 117, and adjacent said cam member extending diametrically across the outer face of the disk is an arm 122 secured to the disk by means of a thin flexible plate 123 adapted to permit movement of the free end of the arm toward and from the plate. The free end of the arm is provided with a head 124 protruding through a notch 125 in the periphery of the disk and having inclined teeth 126 adapted to coact with the ratchet teeth 65 of the disk 64. The disks 64 and 118 are thus normally connected together by the engagement of the teeth 126 and the teeth 65, providing in effect a clutch connection between them.

In the rotation of the disk 118, the cam member 117 is moved at a uniform speed from a predetermined initial position toward and ultimately into engagement with the bent end 127 of the pivoted arm 55 which carries the spindle 53 and the worm wheel 52, the arrangement being such that the cam in its movement swings the arm 55 on its pivot 56 and disengages the worm wheel 52 from the drive shaft 19.

To determine the starting point of the cam member 117, the front wall or plate 80 of the casing is provided with an indicator wheel 128 pivoted to the plate so as to be free to rotate with a slight frictional engagement with the plate. Said wheel carries a stop pin 129 projecting inwardly from a point near its periphery, and on the rim 130 of the wheel is provided a scale 131 (Fig. 8) reading in minutes or seconds as desired. The periphery of the wheel is toothed as at 132, and a spring pressed detent member 133 (Fig. 3), pivoted on the front plate 80 of the casing, is adapted to hold the wheel 128 in any set position.

In practice it is determined in advance by the management of the plant the length of time in which a given operation including legitimate idle time such, for example, as that required to feed and remove the work, should be performed by a given machine. If, for example, it is determined that the period is fifteen seconds in duration, the wheel 128 is adjusted in accordance with the scale on its periphery to position the stop pin 129 such distance from the bent end 127 of the arm 55 that the clutch arm 122 will travel from the pin to the arm and swing it to disconnect the worm wheel 52 from the shaft 19 at the expiration of the predetermined period of fifteen seconds. If, through failure of the operator or the machine, the operation should not be completed within the fifteen seconds allotted, the worm wheel 52 will become disengaged from its driving shaft and the operation of the time totalizer will consequently be interrupted.

Also the chart mechanism will be operated to indicate the failure of the machine to finish its operation in the time allotted. This latter operation is accomplished by the opening of the switch 22 (Figs. 5 and 13) which is interposed in the circuit leading from the source of supply to the marker magnet 23. This switch 22 comprises a movable contact member 134 (Fig. 5) and a stationary contact member 135 interposed in a line 136 leading from the source of supply to the magnet 123. The movable contact member 134 has its free end positioned normally in the path of the pin 67, which latter is extended inwardly as shown in Fig. 5. When the spindle 53 is moved to disengage the connection between the worm wheel 52 and the shaft 19, the pin 67 is also slid inwardly and the arrangement is such that it engages with the free end of the contact 134 with a cam action causing it to move away from the contact 135 and thus open the circuit. The result is that the magnet 23 becomes deenergized and the stylus or marker 16 is permitted to move to the right (Fig. 12) onto the black line 48.

Figure 4:
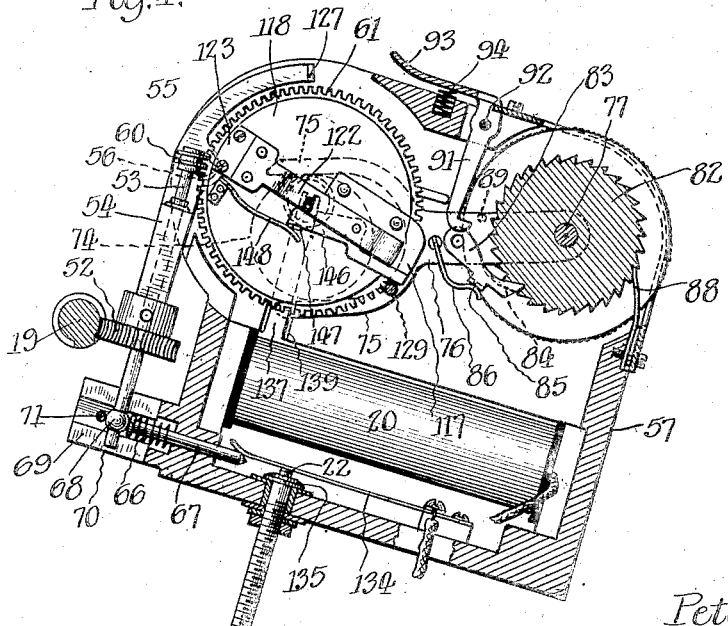
Fig. 4 is a similar view but taken partially in section to show the construction of the time totalizer and of a switch mechanism operated under the control of the speed register.

On the other hand, when the productive capacity of the machine equals or exceeds the predetermined rate the time totalizer or register and the recording mechanism are permitted to continue in operation uninterruptedly without regard to the completion of the successive operations. Thus in the instant case, if the given operation is performed within the fifteen seconds period allotted the connection between the unit spindle 53 and the drive shaft 19 remains unbroken. This is accomplished under the control of the magnet 20 (Fig. 13) which in turn is controlled by the switch 21 at the shop machine. Said magnet (Figs. 3 to 5) is mounted in the lower portion of the casing 57 and has an armature 137 (Fig. 10) hinged on a thin flexible strip 138 in one edge of the bottom peripheral wall of the casing, the latter being cut away as at 139 for this purpose. The upper or free end of the armature is bifurcated to receive a grooved head 140 on the rear end of a pin 141 axially slidable through the sleeve 119 (Fig. 8) the latter being axially apertured for this purpose. To receive the upwardly extending portion of the armature, the rear face of the wall 63 of the casing is provided with a groove 142 terminating in the recess 121 which is disposed axially of the pin 141. The opposite or forward end of the pin 141 is adapted to engage the clutch arm 122 and the arrangement is such that when the magnet 20 is energized under the control of the switch 21 at the shop machine, the armature 137 operates to move the pin 141 axially and lift the clutch head 124 away from the disk 64 until the ratchet teeth 126 become disengaged from the ratchet teeth 65 on the disk 64. When the arm 122 and hence the disk 118 is thus released from the disk 64, the former disk 118 rotates in a reverse direction from that of the direction of the worm wheel 61 and the disk 64, under the action of a coiled torsion spring 143. This spring (Figs. 7 and 8) has one end anchored to the bearing member 62 as at 144 and its other end anchored to the disk 118 as at 145. It will be apparent that when the disk 118 is rotated through its driving connection with the disk 64, the spring is placed under tension; and when the driving connection between the two disks is broken by the operation of the magnet 20, the disk 118 is restored to its initial position under the action of the spring, such position being determined by the position of the stop pin 129.

It will be understood from the foregoing that the operation of the switch 21 at the shop machine upon the completion of its operation will cause the magnet 20 to be energized and the latter in turn, through the operation of its armature 137, will disconnect the arm 122 and hence the disk 118 from its driving association with the disk 64 and thus interrupt the travel of the cam 117 so as to prevent it from disengaging the gear 52 from the shaft 19. By this means the time totalizer and the chart mechanism is permitted to operate continuously so long as production equals or exceeds the predetermined rate, but when it falls below such rate the cam 117 is permitted to operate to interrupt the operation of these registering devices. In the event that such operation is interrupted through the operation of the cam 117 such interruption continues until the operation of the shop machine is completed and the magnet 20 energized to restore the arm 122 to its initial position.

It may thus happen that due to slowness on the part of the operator or inefficiency in the operation of the machine, successive operations may require more than the time allotted. In this event the connection between the registering unit and the shaft 19 is broken once for each operation and the circuit to the marker magnet is opened once for each operation, with the result that the time totalizer device gives credit only for efficient operation and the chart mechanism produces a succession of transverse marks 50 (Fig. 12), which when occurring in close succession produces the ribbon-like section on the chart indicated at 51. Obviously such a record gives immediate notice to the management that the machine is producing inefficiently, and the fault can be located and remedied.

It may sometimes happen through accident that the shop machine will stop just at the point at which the switch 21 is operated with the result that the magnet 20 continues to remain energized and permits the arm 122 to remain stationary against the stop pin 129, thus rendering the interrupting mechanism inoperative and permitting the time totalizer and the chart mechanism to operate continuously. In order that this may not occur, I provide means for ensuring that when the cam 117 is restored to its initial position by the operation of the magnet 20, the arm 122 and hence the ratchet clutch teeth 126 will be permitted to move into engagement with the teeth 65 of the driving disk 64. This means comprises a finger 146 pivoted between its ends on the arm 122 and disposed between the arm and the disk 118, the arm being offset upwardly as shown in Fig. 8 for this purpose. Said finger normally lies substantially parallel with the arm 122 and has a stop lug 147 at one end which is held against one edge of the arm by a leaf spring 148. In this position of the parts, the inner end of the finger is interposed between the arm 122 and the forward end of the pin 141. The opposite end of the finger is offset in a direction laterally away from the arm 122 as shown clearly in Fig. 5 and this offset portion of the finger is adapted to engage with the stop pin 129 in the operation of restoring the cam member 117 to its initial or starting position. Such engagement of the finger with the stop pin swings the finger to carry the inner end thereof out from between the pin 141 and the arm 122. The arrangement is such that the presence of the inner end of the finger 146 between the pin 141 and the arm 122 is necessary to enable the magnet to disengage the clutch connection 126, 64; and obviously, therefore, when the finger is moved out from such operative position, the arm 122 will be permitted to move inwardly to cause the teeth 126 to engage with the teeth 65 of the disk 64 notwithstanding the fact that the magnet 20 should continue to remain energized and the pin 144 held in its forward or operative position. Consequently, the disk 118 and the cam member 117 carried thereby is caused to advance to interrupt the driving connection between the registering unit and its shaft 19; and the arm will not be released for movement to its initial or starting position because the inner end of the finger 146 will be held in its inoperative position by the pin 141 occupying as it does its foremost position due to the continued energization of the magnet 20. When the shop machine is again started the magnet 20 becomes deenergized thus withdrawing the pin 141 and allowing the parts to operate in their normal manner.

In order that the clutch connection 126, 65 between the two disks 118 and 64 may be broken at will, the rear face plate 121ª of the unit casing may be provided with an aperture 149 through which a suitable instrument may be inserted to engage the grooved head 140 on the pin 141.

It will be observed from the foregoing that the speed register constitutes a controller for the time totalizer and for the chart mechanism and it in turn is solely under the control of the switch 21 at the shop machine. If the rate of production is below the predetermined rate, the time totalizer automatically deducts the excessive or waste time and the chart mechanism indicates the inefficiency graphically. On the other hand, if the operator is able to increase the rate of production of the machine, these registering devices will function continuously, the time totalizer registering the time actually consumed and the chart mechanism registering or recording permanently the period during which the operation occurred during the course of the day. The volume register or counter indicates the number of operations performed, it being observed that the magnet 25 of this device is also under the control of the switch 21. Such registration of the number of operations performed is important for it is independent of the rate of production. Thus the chart mechanism, for example, may indicate only that the shop machine is operating efficiently, but does not indicate whether the machine is producing at the predetermined rate or at a greater rate. For registration of the rate of production, therefore, beyond the predetermined rate, the counting device is depended upon.

By reference to the time totalizer, it can be readily determined what the total producing time has been over a day's run or other period, and thus it can be estimated what portion of that period was actually utilized in producing operation. The chart mechanism makes a permanent graphic record of this producing time so that it is available for instant and ready reference.

I claim as my invention:

1. In apparatus of the character described, the combination of a movable member, means for driving said member at substantially constant speed, and control means including an electric circuit and switch adapted for control by a shop machine and operative thereunder to disconnect said member from its driving means when and only when the rate of production of the shop machine falls below a predetermined minimum.

2. In apparatus of the character described, a control mechanism including means adapted to measure off a predetermined fixed period of time, a member arranged to travel at a uniform rate of speed toward a fixed point, and means adapted for control by the speed of operation of the machine whose production is being measured and operable thereunder to interrupt the travel of said member before it reaches said fixed point.

3. In apparatus of the character described, the combination of a movable member, means for driving the member, a control element normally operative to disconnect the member from its driving means at the end of a predetermined time period, and means adapted for control by a shop machine and operative thereunder to supersede the control element in the control of said member so long as successive productive operations of the shop machine are commenced within the said time period.

4. In apparatus of the character described, a control mechanism including a member arranged to be driven at a substantially uniform speed and unless sooner interrupted through a predetermined length of travel, an electromagnet adapted for control by a shop machine, and means controlled by the magnet for interrupting the travel of said member.

5. In apparatus of the character described, the combination of a drive shaft, a casing stationarily supported adjacent the shaft, and, mounted within said casing, a swingably supported spindle normally held in operative connection with the shaft, a rotary member driven by the spindle, and cam means operative in the rotation of said member to swing the spindle out of operative engagement with the shaft.

6. In apparatus of the character described, the combination of a drive shaft, a rotary member, a spindle normally driven by the shaft and arranged to drive said member, a swinging support for said spindle, a cam member rotatable with said rotary member and adapted in its movement to engage said swinging support whereby to disengage the connection between the spindle and the drive shaft, and means for restoring the cam member to a starting position operable at any point in its travel with said rotary member.

7. In apparatus of the character described, a control mechanism comprising, in combination, a drive-shaft carrying a worm, a rotary member, means for driving the member from the shaft including a worm gear operatively connected with the member and normally engaging the worm on the shaft, and a control element mounted concentric of and normally biased to operative connection with said member and adapted on reaching a given point in its angular movement therewith to effect the disconnection of the worm gear from the worm.

8. An apparatus of the character described having a controller device comprising a rotary member normally driven at a uniform speed, means having a disengageable connection with said member adapted to interrupt it at a predetermiend point in its travel, and electromagnetic means operable to render the last mentioned means inoperative.

9. An apparatus of the character described having a controller device comprising a rotary member normally driven at a uniform speed, means having a disengageable connection with said member adapted to interrupt it at a predetermined point in its travel, means operable to render the last mentioned means inoperative and comprising a part having a clutch connection with said member, and electromagnetically controlled means for moving said part to disconnect it from said member.

10. In apparatus of the character described, control mechanism comprising, in combination, a rotary member, means for driving said member at a substantially constant speed, a control element adapted to travel with said member through a determinate radial angle and at the limit of its movement to disconnect said member from its driving means, and means adapted for control by a shop machine and operative thereunder on the commencement of a new productive operation of the shop machine to disconnect said element from said member and to return it to its starting point and there restore it to operative connection with said member.

11. In apparatus of the character described, the combination of a drive shaft rotating at substantially constant speed, a rotary member normally in positive operative connection with the shaft, a control element concentric of and normally in operative connection with said member adapted on reaching a given point in its movement to effect the disconnection of the member from the shaft, and control means including an electric switch operative on the actuation of the switch to disconnect said element from said member at any point in the movement of the element and to return it to a given starting point and there restore it to engagement with said member.

12. In apparatus of the character described, the combination of a rotary member normally driven at a uniform speed, a second member having a disengageable clutch connection with said first member and normally adapted to move therewith, and electromagnetic means operable at any point in the travel of the first member to disengage the second member from the first member.

13. In apparatus of the character described, the combination of a pair of disks one of which is normally connected with a source of power to be driven thereby, means providing a connection between said disks whereby they normally rotate together, means carried by the second disk adapted to interrupt the rotation of the first disk, and electromagnetic means operable to disconnect the second disk from the first disk.

14. An apparatus of the character described having a controller device comprising, in combination, a disk normally driven, a second disk having a disengageable connection with the first disk so as to be driven thereby, spring means tending to restrain rotation of the second disk by the first disk, means operating in the rotation of the second disk to interrupt the operation of the first disk, and electromagnetic means operative at any point in the travel of the second disk to disconnect it from the first disk for movement by said spring means.

15. An apparatus of the character described having a controller device comprising a casing, a rotary member mounted in said casing and normally driven at a uniform speed, a second member also mounted in said casing and having a disengageable connection with the first member, spring means arranged to be placed under tension in the operation of the second member by the first member, means operating in the rotation of the second member to interrupt the movement of the first member, a stop carried by said casing, and electromagnetic means operable to disconnect the second member from the first member whereby to permit said spring to restore it to initial position as determined by said stop.

16. An apparatus of the character described having a controller device comprising, in combination, a disk normally driven at a uniform speed, a second disk having a disengageable connection with the first disk so as to move therewith, a spring arranged to be placed under tension by the rotation of the second disk, the means connecting said disks comprising an arm on the second disk, means operating in the rotation of the second disk to govern the rotation of the first disk, electromagnetic means for moving said arm whereby to release the second disk from the first disk, and a stop for limiting the movement of said arm by said spring.

17. An apparatus of the character described having a controller device comprising, in combination, a rotary member normally driven at a uniform speed, means operable at a predetermined point in the rotation of said member to interrupt its travel, and means for rendering the last mentioned means inoperative including a part having a disengageable clutch connection with said member, a spring placed under tension in the movement of said part, an adjustable stop, and electromagnetic means for moving said part to release it from said member and permit its movement into engagement with said stop by said spring.

18. An apparatus of the character described having a controller device comprising a rotary member normally driven at a uniform speed, means operating in the rotation of said member to interrupt its travel including a second member, a clutch device normally connecting said two members, an adjustable stop, a spring tending to move the second member toward said stop, and means operable at any point in the rotation of the second member to disengage the second member from the first member.

19. An apparatus of the character described having a controller device comprising a rotary member normally driven at a uniform speed, means including a second member operable to interrupt the travel of the first member, a clutch providing a connection between said members including a movable part, an adjustable stop, a spring tending to move said second member toward said stop, means for moving said part to disengage the second member from the first member including a push pin, and means adapted to render the push pin inoperative to hold the second member disconnected from the first member.

20. An apparatus of the character described having a pair of members one of which is arranged to be driven, a disengageable clutch connection between said members including a movable part on one of said members, means tending to rotate the last mentioned member and said part reversely, a stop, means for moving said part to disengage said clutch connection including an actuating element having a limited movement, and a device on said part adapted to engage said stop for movement into a position such as to render said actuating element inoperative.

21. An apparatus of the character described having a controller comprising a member driven at a uniform speed, means including a second member operable to interrupt the travel of the first member, and means for interrupting the travel of the second member including a part having a disengageable connection with the first member, electromagnetic means for moving said part, and means operating to render said electromagnetic means inoperative to hold said part disengaged from the first member.

22. In apparatus of the character described, a control device including a switch, a member arranged to travel at a uniform rate of speed to operate said switch at the end of a predetermined interval, and means adapted for control by the operation of a shop machine for interrupting the travel of said member, said means including an electromagnet having an armature operable to effect such interruption only upon the completion of a predetermined number of operations of the shop machine.

23. In apparatus of the character described, the combination of a drive shaft, a rotary member normally in operative connection with the shaft to be driven thereby, an electric switch, and a control element normally in operative connection with said member and adapted on reaching a given point in its movement both to disconnect said member from the shaft and to actuate said switch.

24. In apparatus of the character described, the combination of a drive shaft, a spindle movably supported and normally held in geared connection with the shaft, an electric switch, means operative by the movement of the spindle to and from connection with the shaft for actuating the switch, means actuated by the rotation of the spindle and operative at a given point in its angular movement to move the spindle from connection with the shaft, and electromagnetically controlled means for rendering said spindle disconnecting means inoperative.

25. In apparatus of the character described, the combination of a drive shaft, a stationary support adjacent the shaft, a rotary member journaled in the support, a spindle having one end connected with the rotary member and having a disengageable connection with the shaft, an electric switch actuated by the engagement and disengagement of the connection between the spindle and shaft, and means driven from the shaft and operative after a predetermined limit of travel to disengage the connection between the spindle and the shaft.

26. In apparatus of the character described, the combination of a shaft driven at a substantially uniform rate of speed, a registering device having a spindle normally connected with said shaft for operation thereby, a member arranged to be driven by said spindle, a switch arranged to be actuated by said member after the latter has travelled a predetermined distance, and means for disconnecting said spindle from said shaft when the rate of production of the machine whose production is being measured falls below a predetermined minimum.

27. In apparatus of the character described, the combination, with a drive shaft, of a registering and control unit adapted to be mounted adjacent the shaft and comprising a spindle adapted to swing into and out of operative connection with the shaft and normally biased to operative connection therewith, an electric switch actuated by the swinging of the spindle to and from the shaft, means driven by the spindle and operative at a given point in its movement to swing the spindle from operative connection with the shaft, and means controllable by a shop machine and operative thereunder to control the spindle disconnecting means.

28. In apparatus of the character described, the combination of a registering device, a drive shaft, a spindle normally in geared connection with the shaft, a rotary member arranged to be driven from the spindle and operatively connected with the registering device, and means actuated by the rotary member and operative to disconnect the spindle from the shaft.

29. In apparatus of the character described, the combination of a drive shaft, a spindle adjacent and normally connected with the shaft, a rotary member operatively connected with the spindle, a registering device arranged to be driven by the rotary member, means operative by the rotation of the member to move the spindle out of operative connection with the shaft, and electromagnetically controlled means for rendering said spindle-disconnecting means inoperative.

30. In apparatus of the character described, the combination of a drive shaft, a casing stationarily supported adjacent the shaft, and, mounted within said casing, a rotary member having a disengageable connection with the shaft, a registering device operatively associated with the rotary member, and means operable in the rotation of said member and under electromagnetic control to control the connection between it and the shaft.

31. In apparatus of the character described, the combination of a drive shaft, a casing stationarily supported adjacent the shaft, and, mounted within said casing, a rotary member, means providing a disengageable connection between said member and shaft, a registering device operatively associated with said member, and means operative in the rotation of said member to mechanically effect the disengagement of the connection of said member with the shaft.

32. In apparatus of the character described, the combination of a main drive shaft, a registering device arranged to be driven by said shaft and including a spindle movable into and out of connection with the said shaft, means for controlling the operative relation between the spindle and the shaft including an electromagnet, a switch for controlling the flow of current from a source of electrical energy to said magnet, and means adapted for control by a shop machine for actuating said switch.

33. In apparatus of the character described, the combination of a main drive-shaft, a cumulative time registering device, means for holding said registering device in positive driving connection with the shaft, and a control device including an electric switch and a member also driven from the main drive-shaft and operable, subject to an earlier actuation of the switch, to effect at the expiration of a predetermined time the disconnection of the registering device from the shaft.

34. In apparatus of the character described, the combination of a registering device and an operating and a control mechanism therefor comprising a rotary member normally driven at a uniform speed, means actuated by the rotation of said member for interrupting its travel, and thereby the operation of the registering mechanism, and electromagnetically controlled means operable to render said interrupting means inoperative.

35. In apparatus of the character described, the combination of a registering device and a control therefor including a rotary member, means for rotating said member forwardly and back within fixed limits, means operable on the rotation of said member to the said forward limit of its movement to control the operation of the registering device, and means adapted for control by a shop machine and operable thereunder to control the extent of the forward movement of said member.

36. An apparatus of the character described having, in combination, a registering device, means for controlling said device, and a mechanism controllable by the rate of production of the producing machine and operative thereunder to supersede said controlling means in the control of said device.

37. An apparatus of the character described comprising a registering device and operating and control means therefor adapted under control by a shop machine to operate the register continuously so long as the actual production of the shop machine continues at a predetermined rate and to interrupt the operation of the register whenever the actual production falls below such rate.

38. In apparatus of the character described, the combination of a shaft driven at substantially constant speed, a rotary member normally held in geared connection with the shaft, a registering device operatively connected with said member, and control means adapted for control by a shop machine and operative thereunder to disconnect said member from the shaft and so to interrupt the actuation of the registering device when and only when the rate of production of the shop machine falls below a predetermined minimum.

39. In apparatus of the character described, the combination, with a registering device, of time controlled means operable to stop the operation of the registering device when the productive rate of the machine whose operation is being measured falls below a predetermined minimum, and means adapted to render the last mentioned means inoperative so long as the rate of production does not fall below such minimum.

40. In apparatus of the character described, the combination, with a device for registering productive and idle periods in the operation of a shop machine, of a control mechanism for said device including a member arranged to travel at a uniform rate of speed adapted to render the registering device inoperative, and means for rendering said member inoperative when the rate of production exceeds a predetermined minimum.

41. In apparatus of the character described, the combination of a registering device and means for the control thereof including a traveling member adapted to effect the stoppage of said device, and a controller arranged to be actuated under the control of a shop machine and operable to interrupt the travel of said member when the rate of operation of the shop machine exceeds a predetermined minimum.

42. In apparatus of the character described, a registering and control unit comprising a casing adapted to be fixed adjacent a drive shaft and, mounted therein, a spindle adapted to swing into and out of geared engagement with the shaft and normally biased to engagement therewith, a time registering mechanism, a rotary member driven by the spindle and arranged to actuate the registering mechanism, a control element normally operatively connected with said member and adapted on reaching a given point in its movement to swing the spindle out of engagement with the shaft, and means controllable by an electric switch and operative on the actuation thereof to disconnect said element from said member at any point in the movement of the element and to return it to a given starting point and there restore its connection with said member.

In testimony whereof, I have hereunto affixed my signature.

PETER A. COONEY.